(12) United States Patent
Tseng et al.

(10) Patent No.: US 7,537,269 B2
(45) Date of Patent: May 26, 2009

(54) FUEL FILLER DOOR INTERLOCK ASSEMBLY FOR A SLIDABLE DOOR

(75) Inventors: Teru Tseng, Troy, MI (US); Eric A. Watterworth, Orion, MI (US); James A. Rochon, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 438 days.

(21) Appl. No.: 11/415,973

(22) Filed: May 2, 2006

(65) Prior Publication Data

US 2007/0257505 A1 Nov. 8, 2007

(51) Int. Cl.
*B62D 25/24* (2006.01)
*B60J 5/06* (2006.01)

(52) U.S. Cl. .................................. 296/155; 296/97.22
(58) Field of Classification Search .................. 296/22, 296/155, 97.22; 49/449
See application file for complete search history.

(56) References Cited

U.S. PATENT DOCUMENTS

| | | | | | |
|---|---|---|---|---|---|
| 5,520,431 | A | * | 5/1996 | Kapes et al. | 296/97.22 |
| 5,676,416 | A | * | 10/1997 | Cooper | 296/97.22 |
| 6,007,141 | A | | 12/1999 | Thomas et al. | 296/155 |

* cited by examiner

*Primary Examiner*—Dennis H Pedder
*Assistant Examiner*—Pinel E Romain

(57) ABSTRACT

An interlock assembly is provided for a vehicle having a body with a selectively openable slidable door and a selectively openable fuel filler door mounted thereto. The fuel filler door is operatively connected with the interlock assembly. The interlock assembly includes a bracket member and a bell crank member pivotably mounted with respect to the bracket member. A pin is slidably disposed with respect to the bracket member and is movable between an extended position and a retracted position. The bell crank member is operable to urge the pin into the extended position when the fuel filler door is open and the retracted position when the fuel filler door is closed. The pin operates to engage a bore defined by the slidable door when in the extended position to substantially lock the slidable door. Preferably, the interlock assembly is mounted with respect to a rear jamb formed by the body.

19 Claims, 2 Drawing Sheets

FUEL FILLER DOOR INTERLOCK ASSEMBLY FOR A SLIDABLE DOOR

TECHNICAL FIELD

The present invention relates to an interlock assembly for a vehicle operable to restrict or prevent the opening of a selectively openable slidable door when a selectively openable fuel filler door is in the open position.

BACKGROUND OF THE INVENTION

Van or van-type vehicles typically include a selectively openable slidable door mounted on tracks by which the door slides rearward to permit access to an interior passenger compartment. Typically, a fuel filler door is mounted with respect to a side wall of the vehicle conceals a fuel filler cap. When the slidable door is open, the fuel filler door is inaccessible. However, when the slidable door is closed, the fuel filler door may be opened to access the fuel filler cap. An inadvertent opening of the slidable door when the fuel filler door is open, such as when fueling the vehicle, may cause the slidable door to interfere with the fuel filler door and possibly cause damage to the fuel filler door and/or slidable door. Various interlock assemblies have been developed to selectively lock or maintain the slidable door in the closed position or limit the travel of the slidable door when the fuel filler door is in the open position.

SUMMARY OF THE INVENTION

An interlock assembly is provided for a vehicle having a body with a selectively openable slidable door and a selectively openable fuel filler door mounted thereto. The fuel filler door is operatively connected with the interlock assembly. The interlock assembly includes a bracket member and a bell crank member pivotably mounted with respect to the bracket member. A pin is slidably disposed with respect to the bracket member and is movable between an extended position and a retracted position. The bell crank member is operable to urge the pin into the extended position when the fuel filler door is open and the retracted position when the fuel filler door is closed. The pin operates to engage a bore defined by the slidable door when in the extended position to substantially lock the slidable door. Preferably, the interlock assembly is mounted with respect to a rear jamb formed by the body.

The interlock assembly may further include a cable having a first end. Additionally, the bell crank member may include a first arm portion and a second arm portion. Preferably, the first end of the cable is mounted with respect to the first arm portion and the second arm portion is engaged with the pin. The cable operates to bias the bell crank member to urge the pin into the extended position. The cable may further include a second end mounted with respect to the fuel filler door. A torsion spring may be mounted with respect to the bell crank member and operate to bias the bell crank member to urge the pin into the retracted position. A vehicle incorporating the interlock assembly of the present invention is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
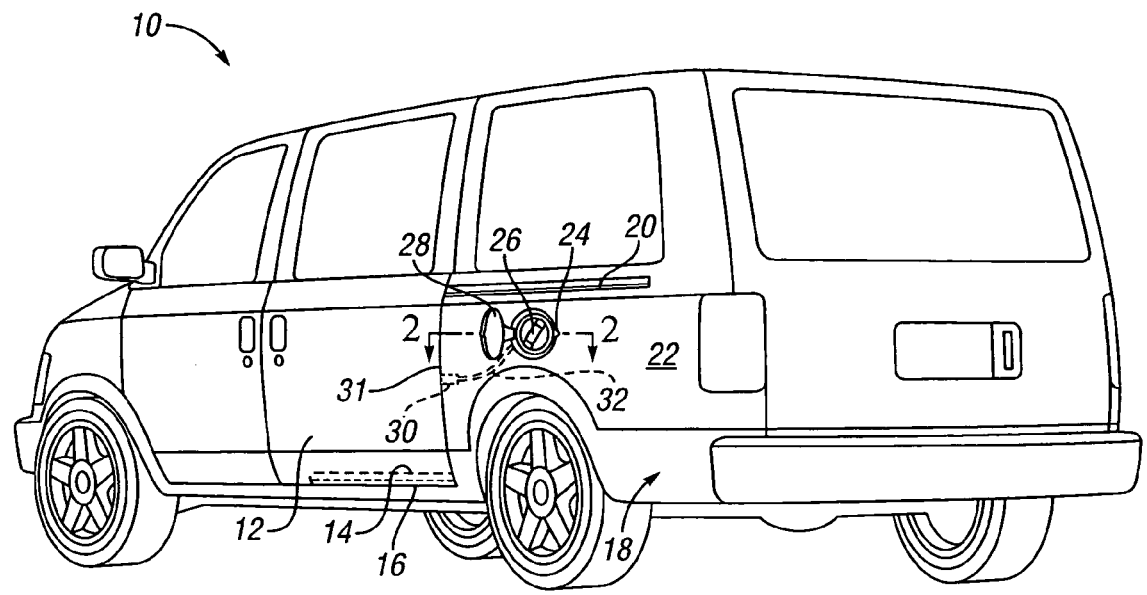
FIG. 1 is a perspective view of a van-type vehicle having a body and a selectively openable slidable door and fuel filler door incorporating an interlock assembly consistent with the invention.

Referring to the drawings wherein like reference numbers correspond to like or similar components throughout the several figures, there is shown in FIG. 1 a vehicle 10, such as a van, having a selectively openable slidable door 12. The slidable door 12 is slidable between its open and closed positions via a floor track 14 mounted with respect to the floor sill 16 of a body 18 of the vehicle 10 and a second track 20 which is mounted with respect to an outer side wall 22 of the body 18.

As shown in FIG. 1, a fuel filler opening 24 is defined by the side wall 22 of the vehicle body 18 to provide access to a fuel filler cap 26. A selectively openable fuel filler door 28 is pivotably mounted with respect to the vehicle body 18 and operates to selectively close the fuel filler opening 24. The fuel filler door 28 is operatively connected to an interlock assembly 30, shown schematically in FIG. 1, through a cable 32. The construction and operation of the interlock assembly 30 will be described in greater detail hereinbelow with reference to FIGS. 3 and 4. With the fuel filler door 28 pivoted to the open position, as shown in FIG. 1, the potential for damage to the fuel filler door 28 and/or the slidable door 12 is increased should the slidable door 12 be moved from the closed position, as shown in FIG. 1, to the open position. As such, the interlock assembly 30 is provided to restrict or prevent the opening of the slidable door 12 when the fuel filler door 28 is in the open position. Alternately, the interlock assembly 30 will allow the slidable door 12 to open when the fuel filler door 28 is in the closed position. The interlock assembly 30 is preferably mounted with respect to a rear jam 31 of the vehicle body 18. This placement of the interlock assembly 30 enables the length of cable 32 to be reduced.

Figure 2:
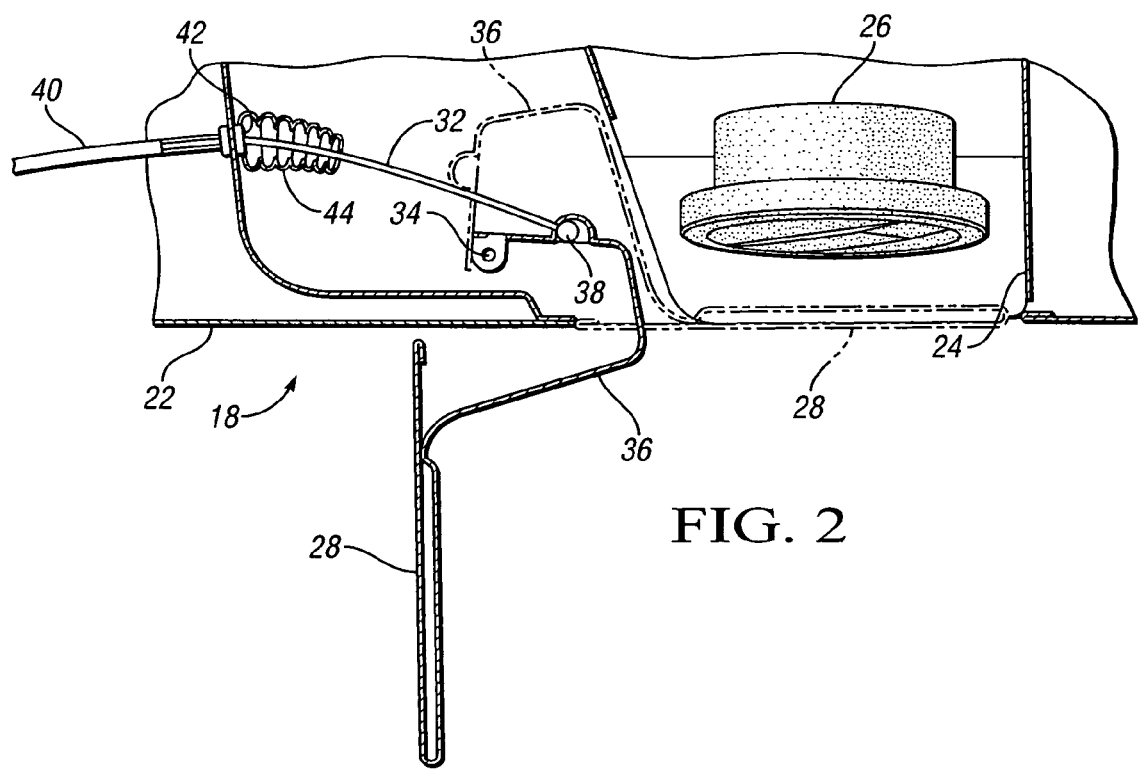
FIG. 2 is a partial cross-sectional view, taken along line 2-2 of FIG. 1, of the vehicle body illustrating the operation of the fuel filler door.

Referring now to FIG. 2, and with continued reference to FIG. 1, there is shown a partial cross-sectional view, taken along line 2-2 of FIG. 1, illustrating the operation of the fuel filler door 28. The fuel filler door 28 is pivotably mounted with respect to the vehicle body 18 by a pivot shaft 34 through a support arm 36. The support arm 36 is sufficiently configured to retain a cable end 38 of the cable 32. The cable 32 is preferably at least partially housed within a sheath 40 to provide a measure of protection thereto. The support arm 36 operates to tension the cable 32 when the fuel filler door 28 is pivoted from the closed position, shown in FIG. 2 with phantom lines, to the open position, shown in FIG. 2 with solid lines. A grommet or bushing 42 is provided to reduce the likelihood of damage to the cable 32 where the cable 32 passes through the vehicle body 18. Additionally, those skilled in the art will recognize that a boot 44 may be provided to prevent the infiltration of debris between the sheath 40 and the cable 32, thereby further tending to increase the reliability of the cable 32.

Figure 3:
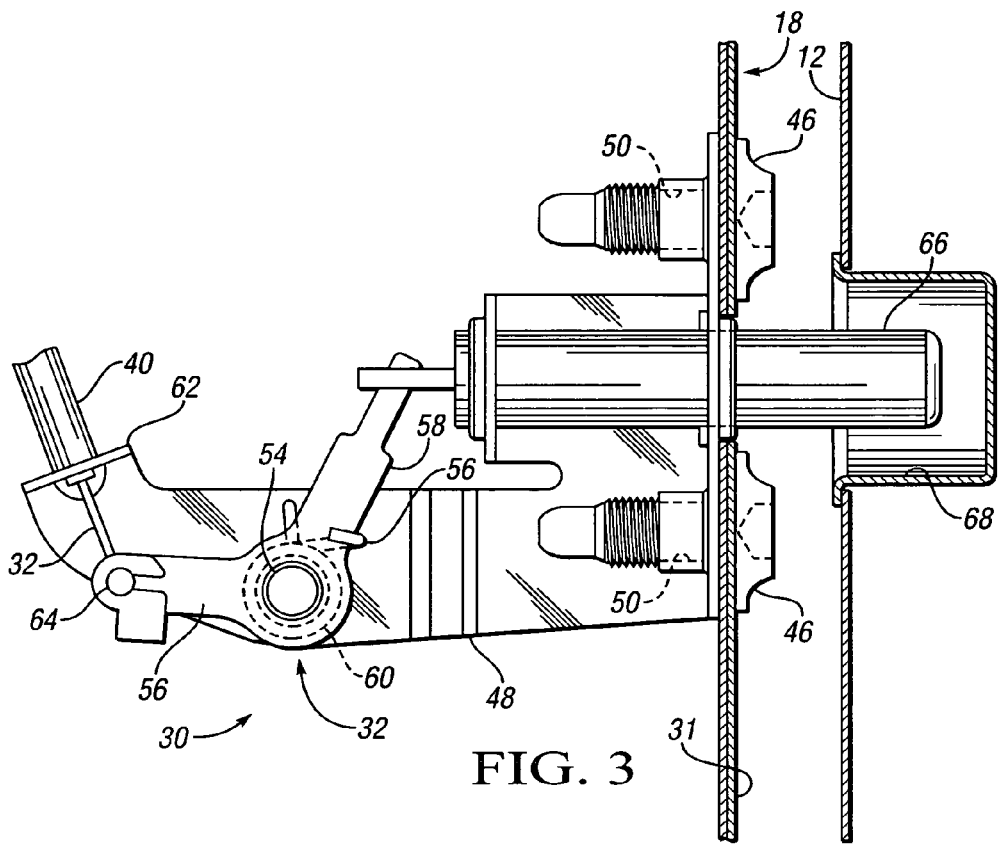
FIG. 3 is a side view of the interlock assembly of FIG. 1 shown in the engaged state.
Figure 4:
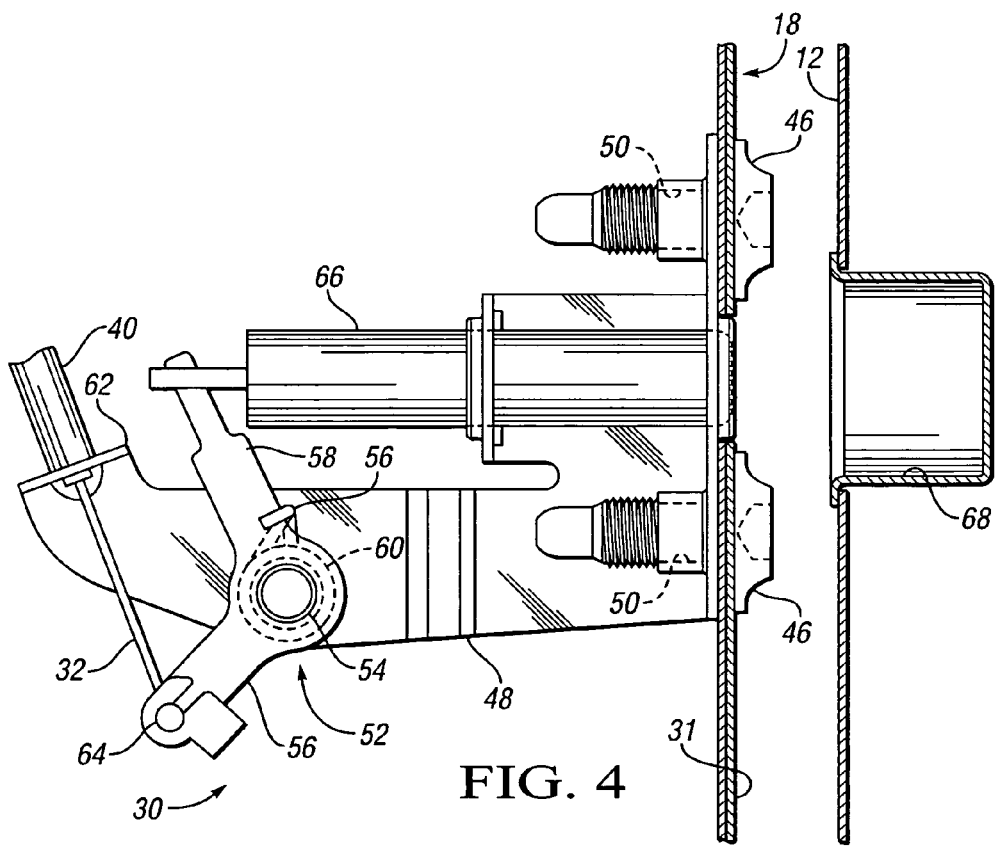
FIG. 4 is a side view of the interlock assembly of FIG. 3 shown in the disengaged state.

Referring now to FIGS. 3 and 4, and with continued reference to FIGS. 1 and 2, there is shown the interlock assembly 30 of the present invention mounted with respect to the rear jamb 31 via a plurality of fasteners 46. A bracket member 48 defines a plurality of bores 50 that are sufficiently configured to receive a respective one of the plurality of fasteners 46. The bracket member 48 has a bell crank member 52 pivotably mounted thereto via a shaft 54. The bell crank member 52 includes a first arm portion 56 and a second arm portion 58. A torsion spring member 60 is coaxially disposed with respect to the shaft 54 and includes a first end portion 56 engaged with the second arm portion 58 and a second end portion, not shown, engaged with the bracket member 48. The torsion spring member 60 operates to bias the bell crank 32 in a counterclockwise direction, as viewed in FIGS. 3 and 4. The bracket member 48 includes a cable retention arm portion 62 operable to retain the sheath 40 with respect to the bracket member 48 and to allow translational movement of the cable 32 with respect to the bracket member 48. The cable 32 includes a cable end 64 engaged with the first arm portion 56 of the bell crank member 52. The cable 32 operates to bias the bell crank member 52 in the clockwise direction, as viewed in FIGS. 3 and 4, against the bias force of the torsion spring member 60.

A bolt or pin 66 is slidably disposed with respect to the bracket member 48. The pin 66 has an extended position, as shown in FIG. 3, and a retracted position, as shown in FIG. 4. The second arm portion 58 of the bell crank member 52 operates to selectively bias the pin 66 into the extended and retracted positions. The slidable door 12 defines a bore 68 sufficiently configured to selectively receive at least a portion of the pin 66 therein. With a portion of the pin 66 disposed within the bore 68, the movement of the slidable door 12 with respect to the vehicle body 18 is substantially restricted or prevented. That is, the slidable door 12 will be locked in the closed position as shown in FIG. 1.

In operation, as the fuel filler door 28 is opened, the support arm 36 will tension or pull the cable 32 via cable end 38. As the cable 32 is pulled within the sheath 40, the cable end 64 will urge the bell crank member 52 to rotate in the clockwise direction against the bias force of the torsion spring member 60. The clockwise rotation of the bell crank member 52 will cause the second arm portion 58 of the bell crank member 52 to bias the pin 66 into the extended position thereby engaging the bore 68, as shown in FIG. 3. As stated hereinabove, with the pin 66 in the extended position, the slidable door 12 is substantially restricted from movement with respect to the vehicle body 18. This is especially beneficial since the opening of the slidable door 12 when the fuel filler door 28 is open, such as when refueling, may cause damage to the slidable door 12 and/or the fuel filler door 28.

As the fuel filler door 28 is closed, the tension exerted on the cable 32 by the support arm 36 is substantially reduced. As such, the torsion spring member 60 will bias the bell crank member 52 in the counterclockwise direction thereby causing the second arm portion 58 to bias the pin 66 into the retracted position, as shown in FIG. 4. With the pin 66 in the retracted position, the slidable door 12 is free to move with respect to the vehicle body 18. This is advantageous since the possibility of interference between the slidable door 12 and the fuel filler door 28 is eliminated with the fuel filler door 28 in the closed position.

While the best modes for carrying out the invention have been described in detail, those familiar with the art to which this invention relates will recognize various alternative designs and embodiments for practicing the invention within the scope of the appended claims.

The invention claimed is:

1. An interlock assembly for a vehicle having a body with a selectively openable slidable door and a selectively openable fuel filler door mounted thereto, the fuel filler door being operatively connected with the interlock assembly, the interlock assembly comprising:
   a bracket member;
   a bell crank member pivotably mounted with respect to said bracket member;
   a pin slidably disposed with respect to said bracket member and movable between an extended position and a retracted position;
   wherein said bell crank member is operable to urge said pin into said extended position when the fuel filler door is open and said retracted position when the fuel filler door is closed; and
   wherein said pin engages a bore defined by the slidable door when in said extended position to substantially lock the slidable door.

2. The interlock assembly of claim 1, further comprising:
   a cable having a first end;
   wherein said bell crank member includes a first arm portion and a second arm portion;
   wherein said first end of said cable is mounted with respect to said first arm portion;
   wherein said second arm portion is engaged with said pin; and
   wherein said cable is operable to bias said bell crank member to urge said pin into said extended position.

3. The interlock assembly of claim 2, wherein said cable includes a second end mounted with respect to the fuel filler door.

4. The interlock assembly of claim 1, further comprising a torsion spring mounted with respect to said bell crank member and operable to bias said bell crank member to urge said pin into said retracted position.

5. The interlock assembly of claim 1, wherein the body defines a rear jamb, said bracket member being mounted with respect to the rear jamb.

6. The interlock assembly of claim 5, wherein said bracket member is mounted with respect to the rear jamb by a plurality of fasteners.

7. The interlock assembly of claim 2, wherein said cable includes a sheath.

8. A vehicle comprising:
   a body;
   a selectively openable slidable door slidably mounted with respect to said body;
   a selectively openable fuel filler door mounted with respect to said body an interlock assembly operatively connected to said fuel filler door, wherein said interlock assembly includes:
   a bracket member;
   a bell crank member pivotably mounted with respect to said bracket member;
   a pin slidably disposed with respect to said bracket member and movable between an extended position and a retracted position;
   wherein said bell crank member is operable to urge said pin into said extended position when said fuel filler door is open and said retracted position when said fuel filler door is closed; and wherein said pin engages a bore defined by said slidable door when said pin is in said extended position to substantially lock the slidable door.

9. The vehicle of claim 8, wherein said body defines a rear jamb and wherein said interlock assembly is mounted with respect to said rear jamb.

10. The vehicle of claim 8, wherein the interlock assembly further includes:
a cable having a first end;
wherein said bell crank member includes a first arm portion and a second arm portion;
wherein said first end of said cable is mounted with respect to said first arm portion;
wherein said second arm portion is engaged with said pin; and
wherein said cable is operable to bias said bell crank member to urge said pin into said extended position.

11. The vehicle of claim 10, wherein said cable includes a second end mounted with respect to said fuel filler door.

12. The vehicle of claim 8, wherein the interlock assembly further includes a torsion spring mounted with respect to said bell crank member and operable to bias said bell crank member to urge said pin into said retracted position.

13. A vehicle comprising:
a body defining a rear jamb;
a selectively openable slidable door slidably mounted with respect to said body and said rear jamb;
a selectively openable fuel filler door pivotably mounted with respect to said body;
an interlock assembly operatively connected to said fuel filler door, wherein said interlock assembly includes:
a bracket member mounted with respect to said rear jamb;
a bell crank member pivotably mounted with respect to said bracket member;
a pin slidably disposed with respect to said bracket member and movable between an extended position and a retracted position;
wherein said bell crank member is operable to urge said pin into said extended position when said fuel filler door is open and said retracted position when said fuel filler door is closed; and
wherein said pin engages a bore defined by said slidable door when in said extended position to substantially lock the slidable door.

14. The vehicle of claim 13, wherein the interlock assembly further includes:
a cable having a first end;
wherein said bell crank member includes a first arm portion and a second arm portion;
wherein said first end of said cable is mounted with respect to said first arm portion;
wherein said second arm portion is engaged with said pin; and
wherein said cable is operable to bias said bell crank member to urge said pin into said extended position.

15. The vehicle of claim 14, wherein said cable includes a second end mounted with respect to said fuel filler door.

16. The vehicle of claim 13, wherein the interlock assembly further includes a torsion spring mounted with respect to said bell crank member and operable to bias said bell crank member to urge said pin into said retracted position.

17. The interlock assembly of claim 1, wherein said bell crank member is continuously engaged with said pin.

18. The interlock assembly of claim 1, further comprising:
a cable having a first end and a second end, said first end of said cable being connected directly to said bell crank member, and said second end of said cable being configured to connect directly to the fuel filler door;
wherein said cable is operable to bias said bell crank member to urge said pin into said extended position and substantially lock the slidable door when the fuel filler door is open.

19. The interlock assembly of claim 1, wherein said pin is disengaged from said bore when in said retracted position.

* * * * *